Nov. 13, 1945.  E. G. LANG  2,389,063
DENTURE PROSTHESIS
Filed May 6, 1943   2 Sheets-Sheet 1

Inventor
Ervin G. Lang
By Williamson & Williamson
Attorneys

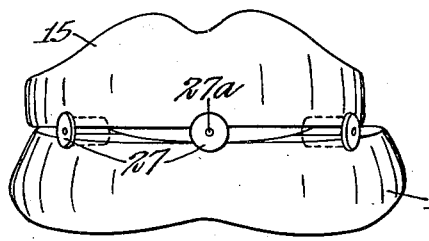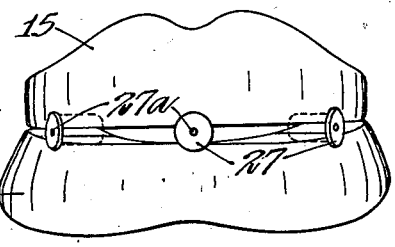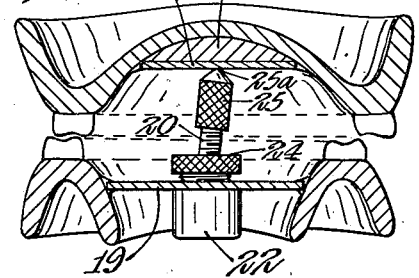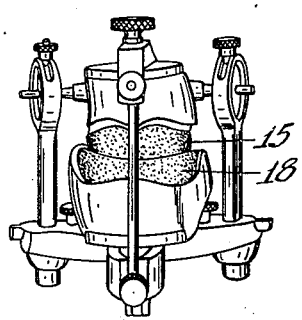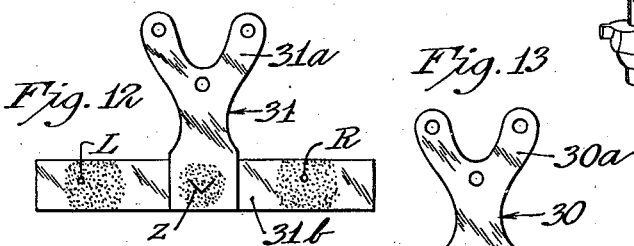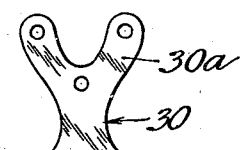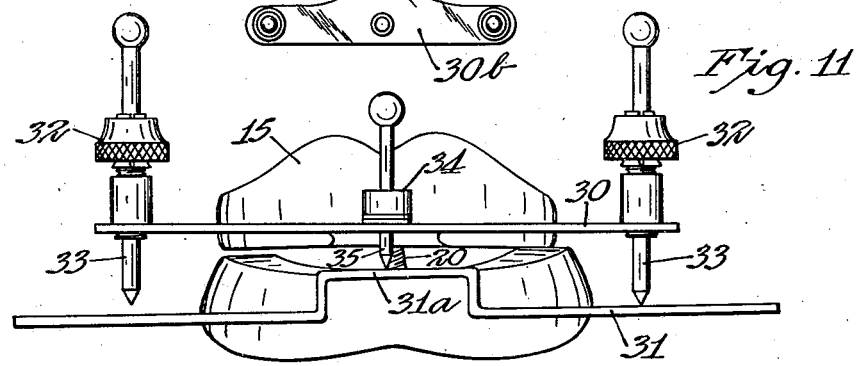

Patented Nov. 13, 1945

2,389,063

UNITED STATES PATENT OFFICE 2,389,063

DENTURE PROSTHESIS

Ervin G. Lang, New Ulm, Minn.

Application May 6, 1943, Serial No. 485,847

8 Claims. (Cl. 32—19)

This invention relates generally to denture prosthesis for full mouth and partial restorations and relates more particularly to a method and apparatus for preparing artificial dentures and restoratives to obtain an accurate balanced and functional occlusion which approaches very closely the masticating and biting functions of the finest natural human teeth.

It is an object of my invention to provide a method and apparatus for use in the construction of denture restoratives which will enable the dentist to accurately obtain the maxilla-mandibular positional relations of the patient, including the true vertical jaw relation for an edentulous mouth, centric relation of the jaws, and lateral relations including the Bennett movement (the path of lateral movement of the condyle heads in their sockets) and which method and apparatus enables conventional types of articulators to be accurately utilized to construct the dentures to substantially, perfectly fit the patient and to cause the center of motion for the completed restoratives to be properly positioned at the head of the patient's condyles. Through the accurate determination of the stated positional relations obtained by my method and apparatus in the mouth of the patient, the condyles of the articulator are very accurately adjusted and set up in the precise position or relationships of the natural condyles of the patient's jaw.

It is a further object of my invention to provide such a method and apparatus which in determining and locating the true vertical, centric and lateral relations of the mandible to the maxilla, accurately allows for cusp rise in all of the various mandibular movements.

The basic principles of denture restoration have not changed materially in the last twenty-five years, but the methods of treatment have passed through an evolutionary period of development from crude, ineffective procedures relying to a considerable extent on chance and guess work, to more scientific and accurate techniques giving better, more pleasing finer results with better functional occlusion.

However, at the present time there are a number of different methods for securing the vertical relation of an edentulous mouth as well as obtaining centric and lateral occlusion, each of these methods obtaining results differing from the other. In the various methods utilized prior to my discoveries, the orientation of the mandibular movements for the restoratives was still based to a considerable extent upon the selection of a hypothetical or assumed spherical surface and the preparation of the restoratives to force the condyles of the patient to function to this sphere. Such methods, while sometimes obtaining fair functional occlusion and sometimes reasonably good aesthetics, too often leave the patient with discomfort, improper functional occlusion and inaccurate maxilla-mandibular relation with unnatural forcing of the condyles. This often means that pressures are unequal upon the bearing surfaces of the gums and mouth, tissues are destroyed, biting and grinding of the teeth are prevalent with the results of traumatic occlusion and the restoratives do not function properly to glide over opposing teeth and fit loosely thereto, or to chew and mix saliva properly or to be capable of a physiological rest position which is so necessary to prevent destruction of the tissues involved.

It is my position that the true vertical, centric and lateral function relationships of the jaws, as in the location of points, curves or lines in geometry and other mathematics, can only be obtained in one way.

On such principle I have created and developed a method and apparatus for carrying out the same which accurately and scientifically when practiced in the mouth and associated with the jaws of the patient determines these positional relationships whereby an adjustable articulator can be very accurately set up to enable the restoratives to be prepared to obtain in every case, accurate results and the proper normal functioning of the patient's condyle, mandibles and occlusal surfaces.

My improved method makes provision for the accurate reproduction of teeth to upper and lower jaws or both where a compound curve peculiar of the condyles in the temporal fossae, such as of the Bennett movement is necessary to obtain functional occlusion.

A further specific object of my invention is the provision of simple apparatus to definitely locate and determine the true positional relations, including vertical, centric and lateral, of the jaws with equal distribution of pressure throughout lateral movements and in such manner that such relations may be accurately reproduced through adjustment of an articulator to obtain the successful results herein enumerated.

A further specific object is the provision of such a method and apparatus wherein the said positional relationships are accurately determined within the patient's mouth through the use of an intra-oral central bearing screw and bearing plate designed to cooperate and with tilting of the bearing screw in lateral excursions of the patient's mandible to obtain uniform distribution of pressure with allowance for cusp rise heretofore impossible with apparatus of the prior art.

Another object is the provision of a tilting intra-oral bearing screw which will coordinate with the pecularities of the mandible joints to facilitate the setting up and correction of set up artificial dentures to accurately coact with such pecularities and which is further accurate and effective to make corrections in dentures that have been used by the patient for some time and which need balancing and restoration of functional occlusion.

Another purpose is the provision of a tilting intra-oral bearing screw which will in coordination with the condylar peculiarities generate a balance upon which artificial dentures can be set up to coact in natural and correct manner and to give the patient in the completed restorative a definite path in coordination with the individualized movements of the condyles in their sockets.

These and other objects and advantages of my invention will be more fully set forth in the following description made in connection with the accompanying drawings, wherein like reference characters refer to the same or similar parts throughout the various views, and in which—

Fig. 6 is a front elevation of my apparatus with the waxed bite rims locked in centric, occlusal relationship;

Fig. 7 is a similar view showing my apparatus with the bite rims locked in correct lateral relationship;

Fig. 8 is a vertical section looking forwardly and showing a pair of practically complete dentures in correct lateral relationship with the bearing screw tilted for the lateral excursion;

Fig. 10 is a perspective view showing an adjustable articulator set up with the bite blocks or case installed on the casts;

Fig. 11 is a front elevational view showing the prepared bite rims equipped with upper and lower dentures utilized in accurately determining check bites in lateral positions;

Fig. 12 is a top plan view of the lower trivet; and

Fig. 13 is a similar view of the upper trivet.

Figure 1:
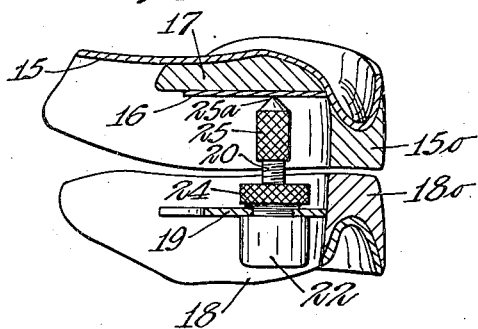
Fig. 1 is a centric, vertical section showing an embodiment of my improved apparatus as it is applied in the patient's mouth.
Figure 2:
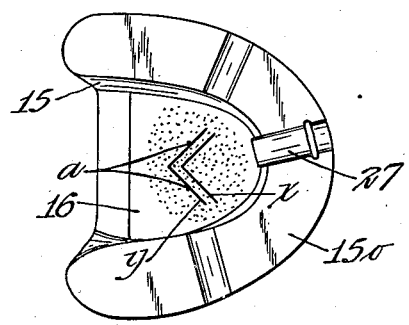
Fig. 2 is a bottom plan view of the upper portion of my apparatus for application to the maxilla.
Figure 4:
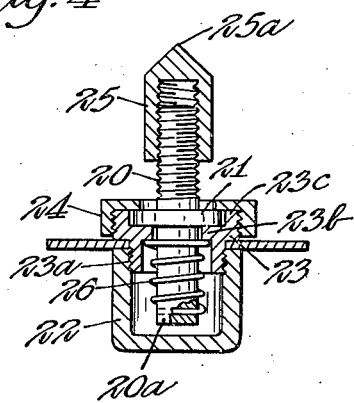
Fig. 4 is a vertical section showing an embodiment of my improved bearing screw locked in upright position and extending normal to its mounting plate.
Figure 3:
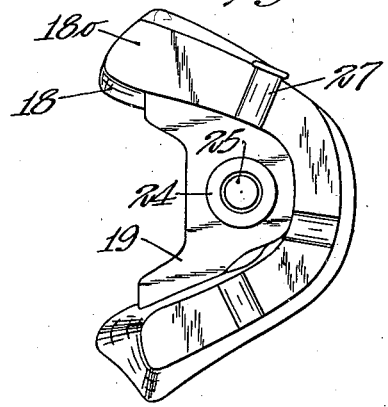
Fig. 3 is a top plan view of the portion of my apparatus for application to the patient's mandible.
Figure 5:
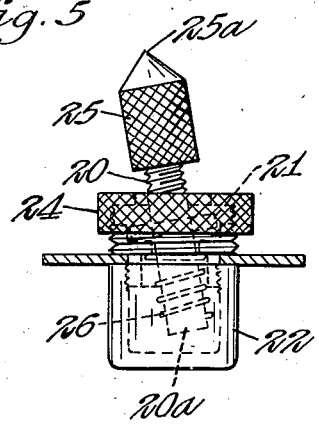
Fig. 5 is a front elevation showing said bearing screw in slightly tilted position with the lock collar released.

Referring now to the apparatus illustrated in Figs. 1 to 7 of the drawings, a pair of bite rims are carefully prepared in conventional manner for upper and lower jaws, these bite rims being accurately molded to properly fit the gums from plaster models obtained in the usual manner. The upper bite rim 15 is provided with a substantially horizontal rigid bearing plate 16 of Gothic arch shape which may be suitably affixed to the palate portion 15a of the bite rim by building up a wax foundation 17, and waxing the marginal edges thereof to the rim or in any other suitable manner. The lower bite rim 18 has a substantially horizontal mounting plate 19 affixed to the lingual wall thereof, the peripheral edge of the plate 19 being substantially Gothic arch shaped and embedded or otherwise affixed by wax or other means to the concavely curved wall of the bite rim 18. This plate is mounted near the upper forward surface of the bite plate proper and carries just rearwardly of such forward portion an upstanding adjustable bearing screw mechanism which will be described in detail hereafter. Both the upper and lower bite rims 15 and 18 are built up with wax, cut and shaped for aesthetics and expression to form occlusal portions 15o and 18o, the shaping and building up being carefully done with the help of records, photographs, facial dimensions and positioning in the patient's mouth.

My bearing screw construction shown in Figs. 1, 3, 4, 5 and 8, includes an upstanding externally threaded pin 20 having rigidly secured to its intermediate portion a disc anchoring base 21 and having its lower end 20a depending below disc base 21 and disposed in spaced concentric relation within a small casing or shell 22 which is disposed below mounting plate 19. A threaded fitting 23 is concentrically disposed of the bearing pin or screw 20 and has a depending reduced skirt 23a to which is shown the shell 22 as threadedly secured. Fitting 23 has a horizontal seating surface 23b for receiving the anchoring base 21 of the bearing screw. It is further provided with an upstanding externally threaded annular flange 23c of slightly greater diameter than the anchoring base 21 to which is detachably secured an internally threaded locking collar 24 for securing the anchoring disc 21 and pin 22 in rigid relationship with the pin extending normal to its mounting plate 19. The upper externally threaded end of pin 20 engages a longitudinally adjustable bearing and tracer cup 25 which terminates at its upper end in a hardened conical bearing and/or tracing point 25a.

The upstanding bearing screw comprising the pin 20 and tracer cup 25, normally are maintained rigidly perpendicular to the mounting plate 19. When locking collar 24 is unscrewed, tilting movement of the bearing screw is permitted, the bearing screw then rocking on an edge of the anchor disc 21. A coil spring 26 of larger diameter than the pin-receiving aperture in seating disc 23b has its lower end affixed to the lower end of pin 20 and surrounds the depending end of the pin with its upper end abutted against the seating disc 23b, thus yieldingly urging the pin 20 to its normal perpendicular position but affording the necessary yielding action to permit tilting of the pin during lateral and other mandible movements of the lower bite rim 18.

To lock the upper and lower waxed bite rims 15 and 18 together in the various predetermined mandibular relations, as will be more fully described later in connection with my improved method, I provide a simple locking mechanism for association with the opposing occlusal surfaces of the bite blocks comprising one or more cylindrical shells 27 of small diameter which are adapted to be approximately one-half embedded by heating in one of the opposing occlusal wax surfaces of a pair of waxed bite rims, while the other half of shell 27 may closely fit a complementary shaped recess formed in the opposing occlusal surface. The shells 27 may be conveniently constructed from the casings for small arms ammunition of small calibre, such as .22 cartridges, the slightly enlarged heads thereof projecting at the outside surface of the bite rims and an aperture 27a being formed in the central portion of the head for attachment of a small dental instrument to apply the locking element.

Fig. 6 shows the upper and lower waxed bite rims or blocks arranged in true centric relationship determined with the bite blocks locked through the medium of my locking elements 27 and their cooperating recesses.

Fig. 7 shows the same bite rims locked in a predetermined lateral relationship.

In carrying out my improved method or technique with the use of the apparatus previously described, the bite rims are carefully prepared and waxed for bite blocks as has previously been described. The bearing screw mounting plate 19, with bearing screw therein, is properly secured to the lower bite plate 18 and the bearing or tracer plate 16 for the upper bite rim 15 is embedded or otherwise secured to the wax of the bite rim on a plane substantially parallel with the occlusal surface thereof. In determining the vertical relationship of the jaws, extraction records, photographs and facial dimensions are helpful but I find the final index to be the only fixed position of the natural mandible; or in other words, the neutral zone or rest position of the mandible. Normally when the mandible is not in function it is suspended from the joints by the coordination of the muscles of mastication and when such muscles are in an unstrained position they are at rest. If the working bite is in a closed position, as from two to three mm., the rest position is certain to give a point from which the true vertical position of the jaws may be obtained.

In obtaining this rest position and true vertical relationship of the jaws, I first mark off two points with an indelible pencil on the patient, one on the lower chin and the other just below the nose. This is done before the bite rims are inserted. The distance between these points is then, after swallowing, set off on a pair of calipers and the bite rims, engaged with the intra-oral central bearing screw and bearing plate 16 as have been specified, are then inserted in the mouth. Upon having the patient lean slightly forward, fully relaxed, the bearing screw, more particularly the cup 25, is adjusted in the mouth until the distance of the markings on the face are equal to that originally set off on the calipers and the bearing screw is then further adjusted to the point where the patient is given the proper physiological free-way space. I further re-check this procedure by having the patient listen to a running motor and/or by having him exert slight pressure, such as is used in swallowing, upon the bearing screw for one-half minute. If the patient still retains the physiological free-way space after this limit of time the true vertical relationship has been obtained and the bearing screw is locked in its adjusted position by a few drops of wax on the pin 20 below the bearing cup 25 so as to keep this vertical relationship until centric relationship is obtained.

Centric relationship of the two bite blocks is next obtained. In accordance with my method the bite rims engaged with the intra-oral central bearing screw and bearing plate 16 are placed in the patient's mouth after adjustment for the vertical relationship and the patient then scribes a tracing on the bearing plate (which has been waxed or smoked) by going through the various movements of the mandible. The various mandibular movements of the patient with the tip of the bearing screw in contact with bearing plate 16 produces a Gothic arch tracing X usually having a well defined apex. If a well defined apex is not obtained the patient is asked to move the mandible protrusively and retrusively generating a substantially straight line intersecting the Gothic arch tracing, the point of intersection determining the true apex. The apex on this tracing X is then notched or indented, which may conveniently be done by grinding a small depression with a No. 4 grinding bur and the bite rims or blocks are then placed in the mouth and the patient is required to bite with the tip of the cup 25 of the bearing screw disposed in said notch. The upper and lower bite blocks are then fastened or locked in this relationship by employment of preferably three of my improved locking elements 27, such elements being heated and manipulated with a suitable instrument and the wax on the opposing and occlusal surfaces of the bite blocks melted to nicely accommodate the locking elements 27. This locked relation constitutes a centric bite check.

The bite blocks so locked are then removed from the patient's mouth; assembled on a plaster cast and mounted on an adjustable articulator of the type shown in Fig. 10. The incisal guide of the articular is then adjusted to proper vertical on the articulator. Lateral relationship in each direction may be obtained in accordance with my method either through the use of the intra-oral bearing screw and bearing plate previously described, or with the use of additional apparatus including upper and lower trivets equipped with markers, spacers and a scribing point, later to be described.

In utilizing my said intra-oral bearing screw apparatus with the lock collar secured and the screw 20 in normal perpendicular position, the tracer or bearing cup 25 is adjusted upwardly 1 mm. beyond its position when centric relationship was determined. This is to allow for cusp rise of the completed dentures. The bite blocks with the bearing screw apparatus attached are then again placed in the patient's mouth and the patient is caused to go through the various mandibular excursions to trace on the wax coating of the bearing plate 16 a second Gothic arch tracing Y which will be slightly posterior of the tracing X made for determining centric relationship. This second tracing Y is notched at points a, that being a suitable range to which the articulator can be anchoredly adjusted and also a maximum range of the mandibular lateral excursion of the patient's mouth, each taken 5 mm. from the apex of the tracing Y on the respective sides of the tracing.

The patient is then asked to find one of the notches with the tip 25a of the bearing screw and while the jaws are held in this relationship the bite plates are locked by use of my locking elements 27 in the same manner as was done for centric. The lock plates are then carried to the articulator where the records for that lateral position are made on the condylar posts. This procedure is similarly carried out for the lateral relationship on the opposite side of the patient's mandible. These lateral, left and right positional relations are sometimes referred to as lateral check bites.

As an alternative and highly accurate means for determining and retaining the two lateral relations of the jaws, I provide for cooperation with the tiltable bearing screw or pin and bearing plate, additional apparatus consisting in a pair of cooperating upper and lower trivets 30 and 31 respectively, each having Gothic arch shaped attachment plates 30a and 31a respectively and having forwardly disposed elongated cross bars 30b and 31b respectively rigidly connected with attachment plates by short flat shanks. The two trivets 30 and 31 are assembled with the prepared bite rims with the bearing screw and the bearing plate waxed in their proper positions. The upper trivet 30 is provided at the ends of the cross bar with collets 32 which hold and adjustably retain vertical position-locating rods 33, the lower ends of which are adapted to engage and be supported from the lower trivet 31. Centrally of the upper trivet 30 a scriber collet 34 is provided adapted to retain a vertical stylus 35, the lower pointed end of which is adapted to inscribe a Gothic arch tracing Z on a coating of compound or wax disposed upon the central and upwardly offset portion 31a of the lower trivet. The end portions of the cross bar 31b of the lower trivet are also preferably coated with compound or wax to receive the locating rods 33 and to enable the rod when the lateral bite is taken in the 5 mm. range of positions to make the recording mark on the lower trivet.

In the subsequent use of the articulator for lateral position relations with the use of my trivets the incisal guide on the articulator is set to proper vertical at which the centric relationship was previously taken with my intra-oral bearing screw and bearing plate.

In utilizing my trivet mechanism as an alternate and possibly preferred method of taking lateral check bites and determining lateral position, the bearing screw 20 connected with the lower trivet is released by loosening the lock collar 24 so that it may tilt with the lateral mandibular movements of the patient. Accordingly a correct radius for such tilting movement is essential which corresponds with the requirements. That is, the length of the bearing screw from its axis of pivoting to the point 25a of the tracing cup for restoratives of cusp-less dentures should be substantially 18 mm. while if cusp teeth are to be utilized a shorter radius of 13 mm. is used. Consequently, the bearing screw, or rather the cup 25 thereof, must be adjusted from the setting for centric to either 13 mm. or 18 mm. as the case may be. The adjustment of this screw usually means that the bearing plate 16 for the upper bite block will have to be built up to correspond with the shortening of the bearing screw. This may be readily accomplished by applying soft modeling compound to the bearing plate on the articulator and the articulator is closed to the predetermined vertical relationship set with the incisal guide as has been previously mentioned. A depression is made on the modeling compound of the upper bearing plate aligned with the notch or depression made for centric at the apex of the Gothic arch tracing X so that the patient when the bite blocks with the trivets attached thereto are disposed in the mouth may engage the point 25a of the bearing screw with such depression.

The lock collar 24 of the bearing screw is released and the bite blocks are positioned in the patient's mouth with the locating rods 33 carried by the collets of the upper trivet properly adjusted to substantially engage the opposing flat surfaces on the lower trivet 30. Likewise, the stylus or scriber 35 is properly adjusted to engage the waxed or coated central and raised surface 31a of the lower trivet. The patient is then required to move the mandible laterally with the tip of the bearing screw engaged with the depression made in the coating of the modeling material on the upper bearing plate and in so doing the patient through the stylus 35 generates a Gothic arch tracing Z—see Fig. 12. Also in the extreme left and right mandibular movements the locating rods 33 will define a point for each lateral position which may be recorded on the wax surface of the horizontal end portions of the lower trivet 30, these points being indicated on Fig. 12 by the letters R and L. Thus three very definite points have been obtained through the use of my trivet apparatus with the tilting bearing screw spacing the bite rims properly and permitting proper relative tilting in the lateral mandibular excursions. These three determined points are utilized to line up and set the articulator, giving the stationary condyle in each instance, the bearing screw and the mark on the receiving table 31a of the trivet. The two condyles of the articulator are accordingly recorded and very accurate positional relationship is thus determined.

The artificial teeth are set up and the denture processed with the use of the articulator in careful conventional manner, the articulator being adjusted through the carefully and accurately determined vertical centric and lateral relationships obtained as herein set forth and through the recordings there obtained.

In the setting up procedure minor errors are bound to occur due to temperature changes, shrinkage of wax, the misfitting of the casting flasks through improper closure, and also in the inaccuracy of all articulators.

One of the very important steps and uses of my method is the correction of all these minor errors through the use of the intra-oral bearing screw and its associated apparatus previously described. The lower processed denture or plate is now provided with the bearing screw apparatus by waxing the mounting plate 19 thereof therein and the upper processed denture has soft modeling compound applied to the palate thereof for engagement with the tip of the bearing screw. With the bearing screw locked in place and the processed dentures in the mouth of the patient, the patient is first caused to bite in centric relationship into the modeling compound with the tip of the bearing screw. The small bearing plate 16 or one similar and specially formed, is then engaged to the depth of the depression made in the modeling compound through the centric bite and is positioned parallel with the line of occlusion. The patient is then caused to bite again into centric relationship and the bearing screw is raised 1 mm. and premature contact of the teeth in occlusion is determined with the use of suitable marking paper between the teeth, such as carbon marking paper. The dentures are then taken out and the high points so determined, ground. The bearing screw is then replaced and reduced ¼ mm. at a time in four successive steps, each time checking for high spots, then grinding.

For correcting functional, lateral and protrusive movements of the mandible, a small amount of modeling compound is placed on the bearing plate previously engaged to the upper denture.

The patient then bites into this coating of modeling compound with the bearing screw and in centric relationship of the jaws. The lock collar 24 of the bearing screw is then released to permit tilting and the depression in the modeling compound reshaped. The bearing screw is raised 1 mm. and the patient is caused to bite into the depression previously made and by the use of carbon paper, high points determined and ground off. In using the carbon paper the patient must, of course, go through the various mandibular movements while the tilting bearing screw is kept in contact in the said depression. In making corrections for lateral and protrusive movements, the bearing screw is successively reduced in length in four steps, shortening the screw ¼ mm. each step, and each time grinding off the interfering tooth surface. When this is done accurate and balanced functional occlusion is established.

With my method and apparatus as disclosed herein, balanced functional occlusion, substantially equal to good natural teeth is consistently obtained.

My method and apparatus disclosed herein is responsible for the following new and improved results:

1. Correct vertical relation or vertical stopping point is accurately determined.
2. True centric relationship of the jaws is obtained.
3. Correct check bites or recording of the condylar paths on the articulator is made possible.
4. By tilting the bearing screw it coordinates with the peculiarities of the manibular joints, thus facilitating the setting up of teeth to coact with such pecularities.
5. With the same tilting bearing screw an invisible path is generated upon which the teeth can be set up to coact in like manner.
6. A definite path for each patient is obtained in coordination with the individualized movements of the condyles in their sockets.
7. In performing the various functions accommodation is made for cusp rise of the artificial dentures to be produced.
8. The foregoing results and advantages are obtained not only in the processed case but in dentures that have been worn for some time and which need balancing in different positions due to changes which have taken place in the oral tissues, etc.
9. Provides a successful method and apparatus for stabilizing dentures in any position through the use of a central bearing point.

As has been previously stated, several of the steps of my method and the intra-oral bearing screw apparatus are successfully utilized to correct dentures which have been worn and used for some time. Oftentimes due to changes, such as absorption of the gum ridges, dentures which were functionally balanced when processed, require correction in the different positions. In such instances my bearing screw apparatus is applied to the lower plate in the manner previously described for correcting the processed dentures and the upper plate with its palate portion is provided with modeling compound and the steps carried out for correction through determining the high points or interference of cusps as previously set forth with reference to the processed dentures not yet used.

It will also be understood that natural teeth when correction for balance or functional occlusion is required, can be corrected through the use of my intra-oral bearing screw applied in the patient's mouth by securing the mounting plate 19 of the bearing screw with wax or compound to the patient's gum and use of compound in the actual palate of the patient.

Figure 9:
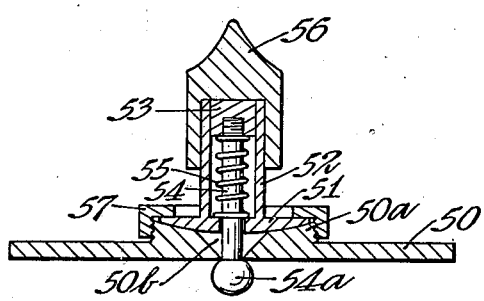
Fig. 9 is a vertical section showing a somewhat different form of bearing screw.

In Figure 9 of the drawings, a somewhat different embodiment of my tiltable bearing screw is shown comprising the mounting plate 50 having a boss 50a which is concave to receive a complementary shaped anchoring disc 51 which is integrally formed or rigidly secured to a cylinder sleeve 52. Cylinder sleeve 52 has mounted therein a small piston 53 which is screw-threadedly attached to the upper end of a short rod 54 having at its lower end a ball 54a which is adapted to fulcrum in a properly dimensioned circular aperture through the boss of the mounting plate 50. The aperture 50b, it will be noted, is flared from its lower to its upper end to accommodate tilting of rod 54. The piston 53 is arched to topmost position by coil spring 55 surrounding the rod 54 and interposed between said piston and the top of the anchoring disc 51. A tracer cup 56 is frictionally set upon the outer end of the cylinder above the piston 53 and may be adjusted longitudinally by turning action. A lock collar 57 similar to the locking collar of the bearing screw first described in the specification is employed having an overlying annular flange for abutment and locking of the disc 51 and having threaded engagement with the periphery of the boss 50a. The tilting of this form of my apparatus is somewhat more accurate than the tilting of the bearing screw illustrated in Fig. 4.

What is claimed is:

1. In combination with a pair of bite blocks fitting a patient's jaws, a bearing post mounted for tilting on one of said blocks and a bearing plate mounted in substantially horizontal position on the other bite block in point contact with and in opposition to the end of said bearing post.

2. Bearing and guiding mechanism for determining positional relationship for preparing artificial dentures and for ascertaining corrections to be made in processed denture restoratives comprising a mounting adapted to be positioned in a bite block or plate, an upstanding bearing post connected with said mounting for tilting relation thereto and a substantially horizontal bearing plate adapted to be mounted in the other denture plate or bite block in opposition to and in point contact with the end of said bearing post.

3. Bearing and guiding mechanism for determining positional relationship for preparing artificial dentures and for ascertaining corrections to be made in processed denture restoratives comprising a mounting adapted to be positioned in a bite block or plate, an upstanding bearing post connected with said mounting for tilting relation thereto and a substantially horizontal bearing plate adapted to be mounted in the other denture plate or bite block in opposition to and in point contact with the end of said bearing post, and means for longitudinally adjusting said bearing post.

4. Bearing and guiding mechanism for determining positional relationships for preparing artificial dentures and for ascertaining corrections to be made in processed denture restoratives comprising a mounting adapted to be positioned in a bite block or plate, an upstanding bearing post connected with said mounting for substantially universal tilting relation thereto and a substantially horizontal bearing plate adapted to be mounted in the other denture plate or bite block in opposition to and in point contact with the end of said bearing post, and means for securing said bearing post in a substantially vertical fixed position.

5. Bearing and guiding mechanism of the class described comprising a mounting, a bearing post extending through said mounting and having an inner thrust end for engagement with an opposed bearing surface, means connecting the other end of said post with said mounting to permit tilting of said post relative thereto in all directions, a laterally extending locking element fixed to the intermediate portion of said post and a cooperating locking collar securable upon said mounting in clamping engagement with said locking element for anchoring said post in a substantially rigid normal relationship to said mounting.

6. Apparatus for determining the position of a patient's jaws to enable denture restoratives to be prepared having in combination a mounting adapted to be attached in substantially horizontal position to a bite block, a bearing post anchored at one end for tilting relation on said mounting and having a tip for engagement with an indentation in an opposing surface of the other bite block, a pair of position locating plates each having attachment portions for anchorage upon the occlusal portions of one of said bite blocks and each having a forward cross piece disposed exteriorly of the patient's mouth when the two bite blocks are properly applied to the jaws of the patient, means for spacing said cross pieces apart comprising a pair of locating rods extending substantially perpendicularly through the end portions of one of said cross pieces with ends in opposition to the opposing cross piece, one of said cross pieces having a raised tracing receiving portion centrally thereof and the other of said cross pieces carrying a longitudinally adjustable stylus at its central portion perpendicularly thereof for contacting said tracing receiving portion.

7. In the preparing of denture restoratives the method steps which consist in inserting and correctly adjusting a substantially vertical bearing post between two substantially parallel thrust surfaces secured to a pair of jaw fitting rims in a patient's mouth to space said jaws apart the proper distance for vertical relationship in natural mastication and moving the mandible laterally with the ends of said bearing post tiltably engaged with said two thrust surfaces to determine the setting up and correction of the artificial dentures.

8. Method steps for determining required corrections in the occlusal and cusp surfaces of artificial and natural dentures which consists in interposing in the mouth, between the upper and lower jaws of the patient and medially of the palate portions, a substantially vertical bearing post and longitudinally adjusting the same according to the properly required vertical relationship of the jaws, connecting one end of said bearing post to a supporting medium connected with one of the patient's jaws with freedom for substantial universal tilting movement, engaging the opposite end of said post by substantial point contact with an indentation in the opposing surface and moving the mandible of the patient in various lateral, protrusive and retrusive positions with said bearing post so applied and thus determining high point or cusp interference through grinding relation in such various movements.

ERVIN G. LANG.